US011487702B2

(12) United States Patent
Williamson et al.

(10) Patent No.: US 11,487,702 B2
(45) Date of Patent: Nov. 1, 2022

(54) OBJECT MINING AND RECOGNITION SYSTEM

(71) Applicant: International Business Machines Corporation, Armonk, NY (US)

(72) Inventors: Leigh Williamson, Austin, TX (US); Aaron Lee, Austin, TX (US); Marietta Johnston, Atlanta, GA (US); Kellin McAvoy, Austin, TX (US); Michael-James Parsons, Sunnyvale, CA (US); Lakshminarayanan Krishm, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 16/179,562

(22) Filed: Nov. 2, 2018

(65) Prior Publication Data
US 2020/0142969 A1    May 7, 2020

(51) Int. Cl.
| G06F 16/11 | (2019.01) |
| G06F 7/08 | (2006.01) |
| G06F 16/14 | (2019.01) |
| G06F 16/2458 | (2019.01) |
| G06N 20/00 | (2019.01) |

(52) U.S. Cl.
CPC ............. *G06F 16/116* (2019.01); *G06F 7/08* (2013.01); *G06F 16/148* (2019.01); *G06F 16/2465* (2019.01); *G06F 2216/03* (2013.01); *G06N 20/00* (2019.01)

(58) Field of Classification Search
CPC .. G06F 16/148; G06F 17/116; G06F 16/2465; G06F 7/08; G06F 2216/03; G06F 16/116; G06N 20/00

USPC ......................................................... 707/752
See application file for complete search history.

(56) References Cited

U.S. PATENT DOCUMENTS

| 5,315,390 A | 5/1994 | Windrem |
| 6,124,561 A * | 9/2000 | Luckhurst ................ B07C 1/00 |
| | | 209/534 |
| 7,072,393 B2 | 7/2006 | Boice et al. |
| 7,437,339 B2 | 10/2008 | Matsugu |
| 7,707,128 B2 | 4/2010 | Matsugu |
| 9,204,103 B1 | 12/2015 | Zhang et al. |
| 9,510,028 B2 | 11/2016 | Yang et al. |

(Continued)

OTHER PUBLICATIONS https://en.wikipedia.org/wiki/SIMD, last modified May 18, 2018, accessed May 21, 2018.

(Continued)

*Primary Examiner* — Hosain T Alam
*Assistant Examiner* — Tracy M McGhee
(74) *Attorney, Agent, or Firm* — Lieberman & Brandsdorfer, LLC

(57) ABSTRACT

Embodiments are directed to a system, computer program product, and method for dynamic object mining. A received file is segmented, re-formatted, and organized into buffers, while maintaining the order of the received file. Multiple buffers are processed in parallel for object mining. A listener is encoded into the buffers to support asynchronous processing, and more specifically ordering of mined objects. An output file of the mined objected or associated frames is created. The file is populated with a sequential ordering of the objects that follows the order of the received file.

20 Claims, 7 Drawing Sheets

(56) References Cited

U.S. PATENT DOCUMENTS

| | | | |
|---|---|---|---|
| 9,578,328 B2 | 2/2017 | Rapaka et al. | |
| 9,760,970 B2 | 9/2017 | Abeykoon et al. | |
| 9,854,261 B2 | 12/2017 | Wu et al. | |
| 2003/0012275 A1* | 1/2003 | Boice | H04N 19/154 |
| | | | 375/240.03 |
| 2016/0198171 A1* | 7/2016 | Wu | H04N 19/44 |
| | | | 375/240.16 |
| 2016/0275642 A1* | 9/2016 | Abeykoon | G06V 10/94 |

OTHER PUBLICATIONS https://en.wikipedia.org/wiki/Cell_(microprocessor), last modified Apr. 4, 2018, accessed May 23, 2018.

https://en.wikipedia.org/wiki/Stream_processing, last modified Apr. 4, 2018, accessed May 23, 2018.

* cited by examiner

OBJECT MINING AND RECOGNITION SYSTEM

BACKGROUND

The present embodiments relate to object mining and object recognition from a digital collection. More specifically, the embodiments relate to formatting the file for object mining and integrating sequential ordering of recognized objects emanating from the formatted file.

Artificial Intelligence (AI) is a branch of computer science that emphasizes creation of intelligent machines. In the field of artificially intelligent computer systems, natural language systems (such as the IBM Watson® artificially intelligent computer system or and other natural language question answering systems) process natural language based on knowledge acquired by the system. Similarly, AI may be applied to process digital images for object detection and recognition. To process natural language or digital images, the system may be trained with data derived from a database or corpus of knowledge relating to the peculiarities of associated constructs and reasoning.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

SUMMARY

The embodiment described herein includes a system, computer program product, and a method for object mining.

In one aspect, a computer system is provided with a processing unit in communication with memory. Tools are provided in the system to support object mining in a manner that supports both parallel and asynchronous management of the identified object(s). The tools include a receiver, an encoder, and a manager. The receiver functions to receive a formatted file or portion of a formatted file. The encoder functions to process, e.g. pre-process the file, for analysis. The encoder subjects the file to segmentation, with two or more segments organized into buffers. More specifically, the encoder subjects the segmented file to further formatting, thereby created a well-formed format of the segments. The manager subjects the segments on a buffer basis for iterative processing. More specifically, two or more buffers are processed in parallel by associated analysis service(s). The manager creates or populates an output file with one or more identified frames of interest from the analysis, with the formatting of the buffers and their associated segments supporting a sequential ordering of the identified frames in the output file.

In another aspect, a computer program product is provided to support object mining in a manner that supports both parallel and asynchronous management of the identified object(s). Program code is provided to receive a formatted file or portion of a formatted file. In addition, program code is provided to process, e.g. pre-process the file, for analysis. The program code subjects the file to segmentation, with two or more segments organized into buffers. More specifically, the program code subjects the segmented file to further formatting, thereby created a well-formed format of the segments. Program code subjects the segments on a buffer basis for iterative processing. More specifically, two or more buffers are processed in parallel by associated analysis service(s). The program code creates or populates an output file with one or more identified frames of interest from the analysis, with the formatting of the buffers and their associated segments supporting a sequential ordering of the identified frames in the output file.

In yet another aspect, a method is provided for object mining in a manner that supports and both parallel and asynchronous management of the identified object(s). A formatted file or portion of a formatted file is received and subject to processing, e.g. pre-process the file, for analysis. The processing subjects the file to segmentation, with two or more segments organized into buffers. More specifically, the processing subjects the segmented file to further formatting, thereby created a well-formed format of the segments. After the file processing is completed, the processed file is subject to iterative processing on a buffer basis. More specifically, two or more buffers are processed in parallel by associated analysis service(s). An output file is created or populated with one or more identified frames of interest from the analysis, with the formatting of the buffers and their associated segments supporting a sequential ordering of the identified frames in the output file.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
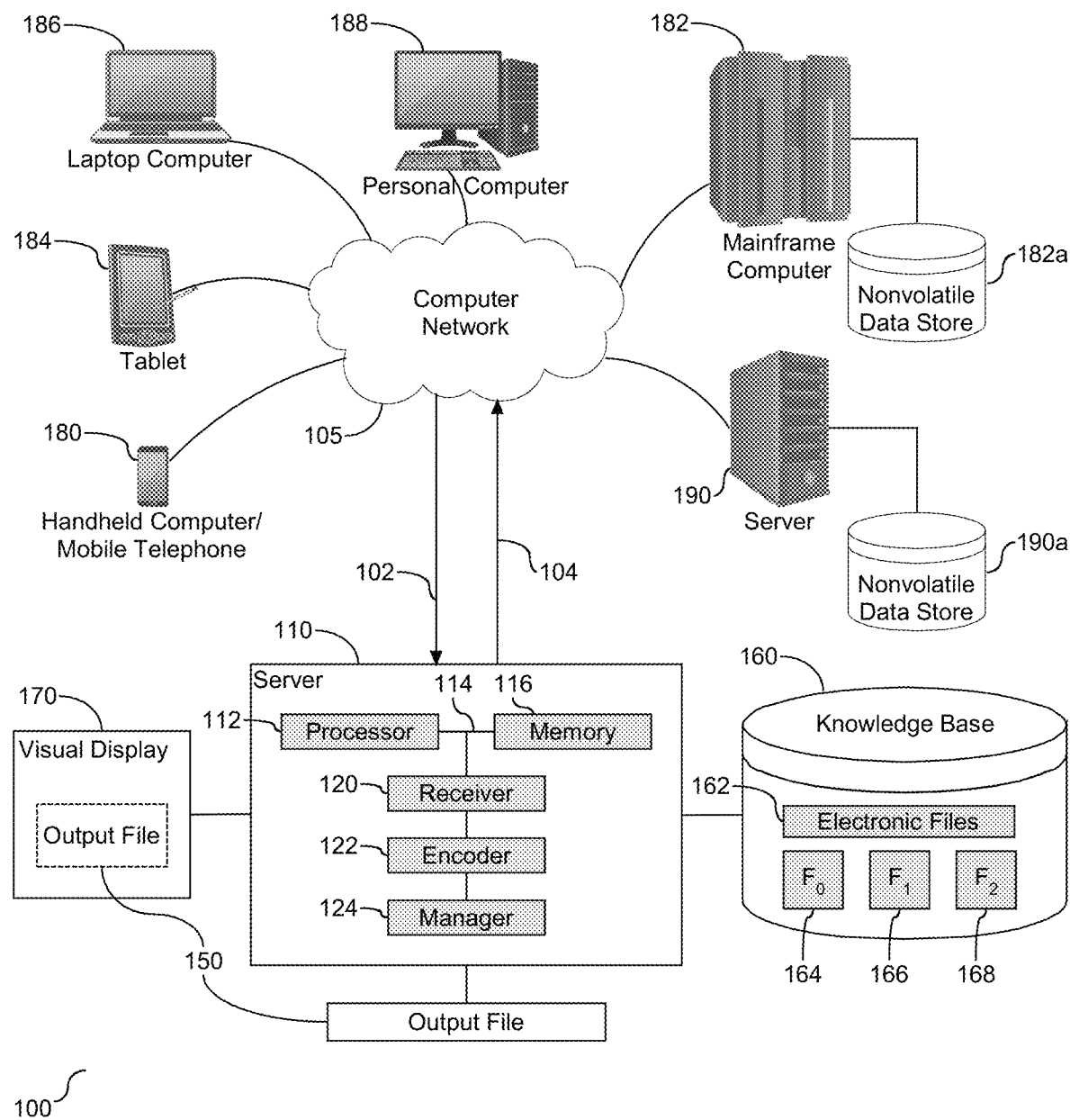
FIG. 1 depicts a block diagram illustrating an object mining system and tools to support analysis of the mined objects.

It will be readily understood that the components of the present embodiments, as generally described and illustrated in the Figures herein, may be arranged and designed in a wide variety of different configurations. Thus, the following detailed description of the embodiments of the apparatus, system, and method, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Computer vision is a field of computer science that works on enabling computers to see, identify and process images, and provide associated output. Computer vision is linked with AI with respect to image interpretations and analysis. The goal of computer vision is to identify objects within one or more associated video files and to provide results based on observation. Intelligent video analytics, such as Machine Learning (ML) based object. recognition within video files requires sequential processing within the file(s), e.g. sequentially processing frames within the files. In the field of video files, the frame is a plurality of digital images which compose a moving picture. It is understood that the time and resources for processing of video files may vary based on length and quality of the associated file(s). As shown and described below, a parallel process is employed to separate or split the video file(s) into segments, with video analytics processing the segments in parallel. Each segment can be an entire video file or a portion, e.g. segment, of a video file. The parallel process shown and described supports both parallel encoding of the associated file(s) and asynchronous processing.

It is understood in the art that videos, and more specifically video files, are comprised of a sequence of digital images. Object mining in system requires object recognition. In one embodiment, object mining is directed at image and image analysis, or in one embodiment a series of images. Object mining requires processor support and services, and in one embodiment is time consuming. As shown and described below, a file subject to object mining is formatted and segmented to support parallel and asynchronous processing of portions of the file, such that results of file analysis are combined based on the formatting, and in one embodiment based on an embedded listening code, e.g. marker. The object mining results are returned without a re-indexing of the segmented file.

Referring to FIG. 1, a block diagram (100) is provided to illustrate an object mining system and tools to support analysis of the mined objects. As shown, a server (110) is provided in communication with a computer network (105) across connections (102) and (104). Several devices may also be in communication with the network (105), including but not limited to handheld computers, mobile phones (180), tablets (184), laptop computers (186), and personal computers (188). The system may also include larger scale devices, such as mainframe computers (182) with separate non-volatile data storage (182a) or servers (190) with separate non-volatile data storage (190a). With the server (110), a processing unit (112), e.g. processor, is shown in communication with memory (116) across a bus (114). Several tools are provided in communication with the processing unit (112), including a receiver (120), an encoder (122), and a manager (124). Although only three tools are shown, the quantity of tools should not be considered limiting.

As shown, the server (110) is in communication with a knowledge base (160) of documents or files, hereinafter referred to as files (162). The knowledge base (160) functions as a corpus, and in one embodiment, may be comprised of multiple corpi, including but not limited to a collection of files and may be a network of files. Alternatively, the knowledge base (160) may function as a single corpus. The knowledge base (160) is shown operatively coupled to the server (110) across the network (105). In one embodiment, the knowledge base (160) may be stored on shared data storage, such as a cloud shared resource. Similarly, in one embodiment, the knowledge base (160) may be locally coupled to the server (110). In the example shown herein, the knowledge base (160) is comprised of shared resources operatively coupled to the server (110) across the network (105). More specifically, the knowledge base (160) is shown with data resources shown herein as $F_0$ (164), $F_1$ (166), and $F_2$ (168). In one embodiment, each data resource may be a collection of files that are accessible by the server (110) or any computing device operatively coupled to the knowledge base (160).

The tools shown herein are directed at two separate, but related, aspects of object mining One aspect is related to preparing the file(s) for the mining process, and another aspect is related to processing the prepared file. Unlike a text based document, object mining is generally not supported by file annotations. Furthermore, it is understood that object mining is directed at object and image analysis and identification, which in one embodiment may require substantial processor resources. The file preparation shown and described herein is directed at supporting efficient use of processor resources, which in one embodiment includes distributed and parallel processing of portions of the file(s) subject to object mining As shown, the receiver (120) is shown operatively coupled to the processing unit (112). The receiver (120) functions to receive one or more files (162) from the knowledge base (160). In one embodiment, the receiver (120) supports a query identification of the one or more files. As briefly explained above, each identified file (162) is prepared for object mining and analysis. The encoder (122) is shown operatively coupled to the receiver (120), and functions as a tool to prepare and format the identified file (162). As shown and described in FIGS. 2 and 3, the encoder (122) separates or otherwise partitions the file into a plurality of file segments, also be referred to as data chunks. In one embodiment, the encoder defines a duration for each of the segments, e.g. 60 seconds each, wherein the first segment includes content from the 0 second mark to the 59 second mark, the second segment includes content from the 60 second mark to the 119 second mark, etc. Based on this example, a one hour video file will have 60 sequential segments. It is understood that the video file may not be evenly divided, in which case the encoder (122) partitions a majority of the file (162) into the segment duration, and the remainder is placed in a segment having a different duration, e.g. length.

The encoder (122) has two levels of partition granularity, including the segment and a buffer, also referred to herein as a pipe. The segment is directed at duration, and the buffer is directed at content size. In one embodiment, each buffer is a fixed or uniform size. Two or more segments are fitted into buffers by the encoder (122). It is understood that individual file segments may have different file formats. As such, the encoder (122) subjects the file segments to an encoding process to produce well-formed data, e.g. uniform formatting of the file data. In one embodiment, the encoding process is a video encoder. The encoded format may be pre-defined such that each second formatted segment will have a specific format, such as, but not limited to, .avi, .mov., .flv., .mpeg, .mpg, .gif, .mp3, .mp4, .wav, .wma, etc. In one embodiment, the encoder (122) selects the format for the segment encoding. The encoder (122) inserts header bits into each buffer to indicate that the data is well-formed. In one embodiment, the encoder (122) performs the segment formatting in each associated segment buffer in parallel while keeping the order of the original segments intact. Accordingly, the encoder (122) essentially converts or creates a well-formatted file comprised of file segments.

The encoded header, e.g. header bits, embedded with the buffers and function to facilitate subsequent processing directed at file format specification. In one embodiment, for those first formatted segments that are already in the desired format, the encoding performed by the encoder (122) ensures that appropriate headers bits are present and that the first formatted segments are well-formed in accordance with the file format specification. Accordingly, the first formatted segments are subject to a format conversion, such that all well-formed segments are kept in the original order with meta-data in the form of a header added to each buffer.

In addition to the file format uniformity, the encoder (122) identifies the start time and time span for each first formatted segment within each buffer, and attaches the identified start time and time span of each segment as metadata to the respective segment. An example of the metadata attachment is shown and described in FIGS. 2 and 3. Accordingly, the encoder (122) essentially transforms the segmented file to a second set of formatted segment(s) with a uniform format and attached metadata, with the attached metadata directed at the time sequence of the segments so that order may be preserved during future analysis and object identification.

As part of the file preparation, the encoder (122) routes each second formatted segment to a video processing service. In one embodiment, the video processing service is an Application Programming Interface (API). Similarly, in one embodiment, a separate API object may be assigned to each of the second formatted segments. In one embodiment, the API object(s) are video processing services to analyze content of the formatted segments that includes code to identify one or more objects that are the subject of the formatted segments present in each buffer. The code is specific and uniquely coded to identify specific features of interest, e.g. objects, facial features, vehicle, vehicle type, subjects, sounds, words, word combinations, etc., in video segments. In addition to the video processing, the encoder (122) incorporates or otherwise attaches an application listener, e.g. listening code, also referred to herein as a marker, to each buffer. The listening code accounts for asynchronous processing of the buffers. Accordingly, the encoder (122) attaches the listener to each buffer to facilitate re-ordering buffers and their associated segments that may have their processing completed out of order.

Figure 3:
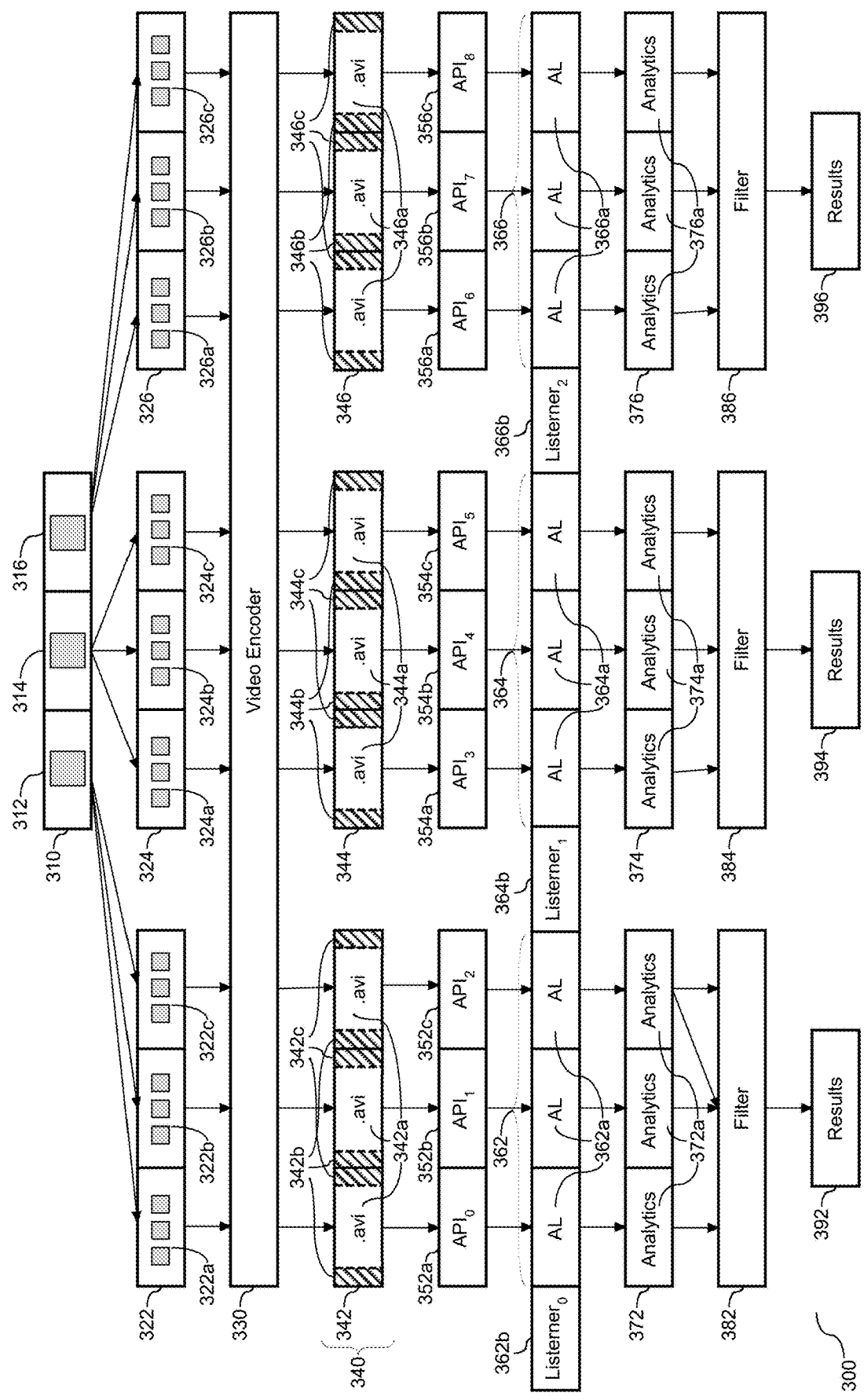
FIG. 3 depicts a block diagram illustrating an example video file and associated processing.

The processing and formatting of the file by the encoder (122) is conducted to support file analysis and filtering. As shown in FIG. 3, the buffers each have an associated listener or listening code, and the segments in each buffer are well-formatted with headers and metadata. As described above and shown in FIG. 3, each buffer is an array of two or more segments. Each buffer and their associated well-formatted segments is subject to processing by the manager (124).

Each segment in each buffer is subject to analysis. As shown, the manager (124) is configured to conduct and/or organize the analysis for each buffer and embedded segments. The analysis may be conducted on a buffer basis in parallel, as shown and described in FIG. 4. The formatting of both the buffers and the segments provides characteristic data to support the parallel file processing and the sequential ordering of the identified frames and/or objects within the file(s) that is the subject of the analysis. The manager (124) identifies processors and/or computing devices, and selectively assigns the buffers to the identified processors and/or computing devices. In one embodiment, the manager (124) identifies one or more computing devices operatively coupled to the server (110) across the network (105). It is understood that each computing device identified by the manager (124) supports an analysis service to analyze the received buffer. In one embodiment, the file is separated into three buffers, and the manager (124) assigns each buffer to a different computing device for processing and analysis, such that each computing device separately processes its received buffer, with the processing of the buffers being conducted in parallel. Based on the analysis or analysis service, the manager (124) identifies one or more frames of interest in at least one of the analyzed buffers. Each identified frame of interest includes a recognized object that meets the analysis criteria. It is understood that one or more frames within a segment may be identified as relevant or irrelevant, depending on the analysis. The manager (124) filters the buffer segments based on a configured relevancy standard. In one embodiment, frames and their associated segments that are determined irrelevant are removed from the segments and associated buffers, such that the frames and their associated segments that are determined relevant remain in their respective buffers, all while maintaining the order of the segments from the original identified order. Accordingly, the manager (124) maintains the order of the identified frames that remain in the buffer as supported by the attached metadata of the respective start times and duration of each segment.

As described above and shown in FIG. 3, each buffer has attached or embedded listening code. It is understood that the segment analysis may be conducted in parallel on a parallel processor, or in one embodiment on separate computing devices. Regardless of the location of the processing, it is understood that the processing may take place asynchronously. For example, if two different buffers and their associated segments are being processed on different computing devices, a first buffer can be processed on a first computing device independently of a second buffer being processed on a second computing device. This allows for maximization of the computing resources. The listening code functions as a marker for the manager (124) to piece together the filtered frames. More specifically, the listener functions as a tool to inform the manager (124) of a response from the next sequential buffer. Accordingly, the listener or listening code functions as a tool for use by the manager (124) to support parallel and asynchronous processing of the buffers and associated segments when subject to analysis and frame identification.

Figure 2:
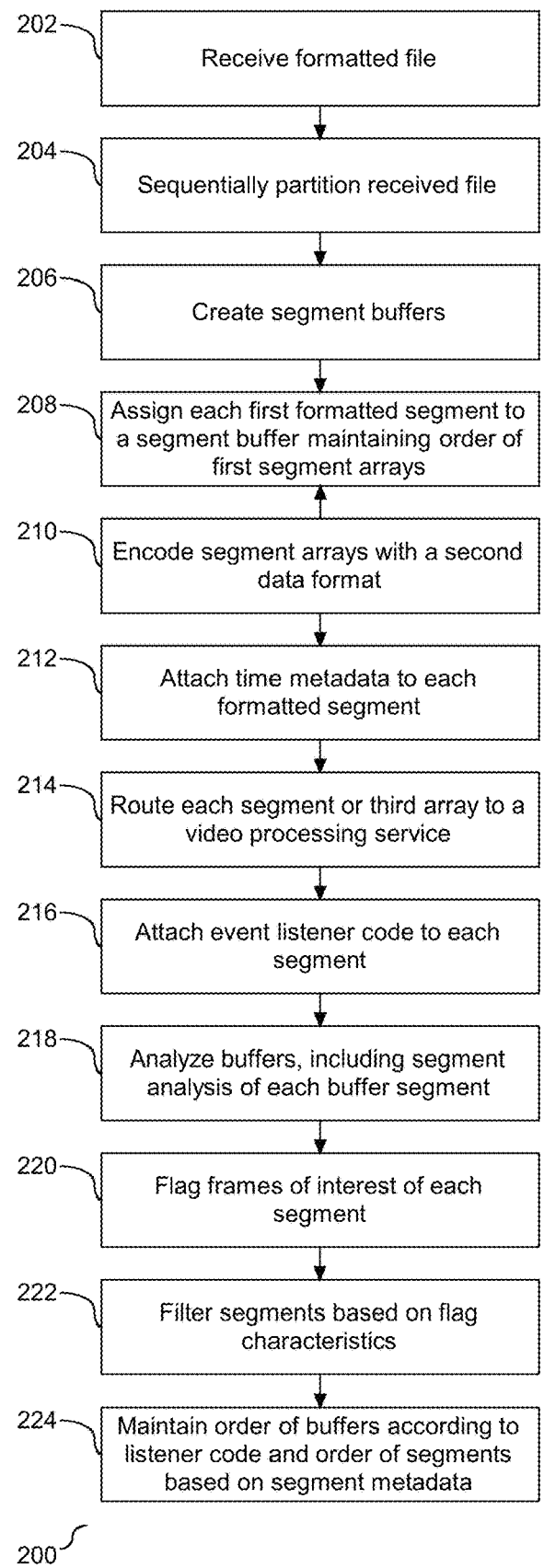
FIG. 2 depicts a flow chart illustrating processing one or more video files with intelligent video analytics and parallel processing directed at object recognition.

The file processing and subject filtering shown and described in FIGS. 2 and 3 is directed at processing file segments in parallel. More specifically, a parallel processor may be employed to process the file and associated segments in parallel. Similarly, in one embodiment, different segments or pipes of the file may be processed in parallel on different machines. The amount of time it takes to process the file in its entirety will be less than or equal to the length of the longest segment. The listener that is attached to each of the segment accounts for asynchronous processing so that an associated receiver of the processed pipes and pipe segments will know how to piece the distributed data back together.

As further shown, an output file (150) is created by the manager (124). The output file (150) includes an arrangement of the identified frames from the analysis service(s). The arrangement is a sequential order of the identified frames as determined by the well-formed format, e.g. embedded header and metadata. The output file (150) is shown residing in the knowledge base (150). In one embodiment, the output file (150) is communicated to one of the computing devices operatively coupled to the server (110) across the network (105). Similarly, in one embodiment, the server (110) includes a visual display (170), and the output file (150) and associated data is presented on the visual display. The output file (150) functions as a physical and tangible output, e.g. article of manufacture, created from the analysis service(s).

The tools (120)-(124) may comprise elements of an artificial intelligence (AI) platform, and more specifically machine learning (ML). Each of the tools, including but not limited to the receiver (120), encoder (122), and manager (124), functions separately or combined to dynamically evaluate one or more objects or images within one or more files. The tools (120)-(124) employ aspects of ML and deep learning for object and image identification. Analysis of the well-formatted segments may utilize a dictionary of object characteristics, which in one embodiment is part of the knowledge base (160), to identify one or more frames within a segment or buffer that includes one or more object characteristics of interest.

In some illustrative embodiments, server (110) may be the IBM Watson® system available from International Business Machines Corporation of Armonk, N.Y., which is augmented with the mechanisms of the illustrative embodiments described hereafter. The IBM Watson® system may receive input content (102), and identify a file for processing commensurate with the receive content. In one embodiment, the identified file is received by the server (110) across the network connection. The server (110) processes the identified file into well-formed segments and organized into the buffers, and submits the buffers to one or more object and/or image analysis services. Such analysis may include, but is not limited to, identification and analysis, and identifies similar content or objects of interest in the file subject to the analysis service. In one embodiment, the analysis service leverage data present in the knowledge base (160) for the object and/or image identification. Though shown as being embodied in or integrated with the server (110), the tools (120)-(124) may be implemented in a separate computing system (e.g., 190) that is connected across network (105) to the server (110). Accordingly, wherever embodied, the tool (120)-(124) detects objects and/or frames of interest while maintaining the order of the identified elements in the output file, with the order commensurate with the original order of the received file.

Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

Referring to FIG. 2, a flow chart (200) is provided illustrating processing one or more video files with intelligent video analytics and parallel processing directed at object recognition. As shown, a file having an associated file format is received (202). It is understood that the file may include content directed at images and audio. For example, in one embodiment, the received file is a video file. The received file is subject to analysis, which in one embodiment is performed on a frame-by-frame basis, searching for specific content and extracting data associated with this specific content. The analysis facilitates locating, and in one embodiment isolating or extracting the specific content. The received file is subject to partitioning (204). The partitioning separates the file into segments, which in one embodiment may also be referred to as data chunks. In one embodiment, the partitioning is accomplished by defining a segment duration, e.g. 60 seconds each, wherein the first segment includes content from the 0 second mark to the 59 second mark, the second segment includes content from the 60 second mark to the 119 second mark, etc. Based on this example, a one hour video file will have 60 sequential segments. It is understood that the video file may not be evenly divided, in which case the majority of the file is partitioned into the segment duration, and the remainder is placed in a segment having a different duration, e.g. length. Accordingly, the file is shown herein subjected to a first segmentation prior to image and object processing.

The file segments created at step (204) are understood to have a first format, e.g. first formatted segments. In addition, as shown and described at step (204), each file system has an equal length, with the exception of any remainder. However, it is understood that the segment length may not be indicative of segment processing. More specifically, as the segments are individually subject to analysis, the time for processing such analysis may differ regardless of the uniform or relatively uniform segment size, e.g. segment duration.

During the partitioning of the file into segments at step (204), a defined structural order is assigned to the first formatted segments. This initial ordering is achieved through the act of sequentially buffering the segments as they are partitioned. As shown and described below, the original order of the first formatted segments is maintained throughout the analysis process. Two or more segment buffers are created (206), and each first formatted segment is assigned to a segment buffer (208). The segment buffer functions as an abstract array of two or more first formatted segments. The act of assigning each of the first formatted segments to the segment buffer at step (208) includes buffering each of the first formatted segments as a function of a predetermined start time of the first formatted segments. The buffered array of segments is essentially a segment array. Each segment buffer and the array of segments therein is subject to or submitted to an encoder (210), which in the case of a video file may be a video encoder. The encoded format may be pre-defined such that each second formatted segment will have a specific format, such as, but not limited to, .avi, .mov., .flv., .mpeg, .mpg, .gif, .mp3, .mp4, .wav, .wma, etc. During the encoding at step (210), generic binary data, a binary data buffer of each segment will have correct header bits inserted into the buffer to indicate that the data is well-formed. The encoding of the segment arrays at step (210) is performed in each associated buffer in parallel while keeping the order of the original segments intact.

As shown at step (210), each segment is documented as complying with the specification of the file format with the documentation reflected in the segment metadata. In one embodiment, header bits are embedded with the segments, and function to facilitate subsequent processing directed at file format specification. In one embodiment, for those first formatted segments that are already in the desired format, the encoding at step (210) ensures that appropriate headers bits are present and that the first formatted segments are well-formed in accordance with the file format specification. Accordingly, the first formatted segments are subject to a format conversion, such that all well-formed segments are kept in the original order with meta-data added to each second formatted segment.

In addition to the file format uniformity, the encoder identifies the start time and time span for each first formatted segment, and attaches the identified start time and time span of each segment as metadata to the respective segment (212). Each segment is subject to transformation at steps (210) and (212) creating second formatted segment(s) with a uniform file format and attached metadata. Accordingly, the formatted segments are processed to attach metadata directed at the time sequence of the segments so that order may be preserved during future analysis and object identification.

Each second formatted segment is routed to a video processing service (214). In one embodiment, the video processing service is an Application Programming Interface (API). Similarly, in one embodiment, a separate API object may be assigned to each of the second formatted segments. In one embodiment, the API object(s) are video processing services to analyze content of the formatted segments that include code to identify one or more objects that are the subject of the formatted segments present in each pipe. The code is specific and uniquely coded to identify specific features of interest, e.g. objects, facial features, vehicle, vehicle type, subjects, sounds, words, word combinations, etc., in video segments. In addition, the video processing incorporates an application listener (216), hereinafter referred to as a listener, to each segment to account for asynchronous processing of the buffers. The listener is encoded into the buffer to facilitate re-ordering of buffers, and their associated segments, that may have their processing completed out of order.

The processing and formatting of the segments shown and described in steps (202)-(216) are conducted to support file analysis and filtering. Following step (216), the re-formed buffers each having an associated listener or listening code. As described above and shown in FIG. 3, each buffer is an array of two or more segments. Each segment in each buffer is subject to analysis, producing a segment analysis for each buffer segment (218). The segment analysis identifies frames within the respective segments that include an object or subject of interest (220). It is understood that one or more frames within a segment may be identified as relevant or irrelevant, depending on the analysis. The segments are subject to filtering based on the configured relevancy standard (222). In one embodiment, frames and their associated segments that are determined irrelevant are removed from the segments and associated pipes, such that the frames and their associated segments that are determined relevant remain in their respective pipes, all while maintaining the order of the buffers from the listeners and order of segments from the original order identified at step (224). The order of the identified frames that remain in the pipe are maintained in their order, and as supported by the attached metadata of the respective start times and duration of each segment.

In addition, as shown and described, each buffer has attached or embedded listening code. It is understood that the segment analysis and filtering at steps (222) and (224) may be conducted in parallel on a parallel processor, or in one embodiment on separate computing devices. Regardless of the location of the processing, it is understood that the processing may take place asynchronously. For example, if two different buffers and their associated segments are being processed on different computing devices, a first buffer can be processed on a first computing device independently of a second buffer being processed on a second computing device. This allows for maximization of the computing resources. The listening code functions as a marker to piece together the filtered frames identified at step (224). More specifically, at step (224), each filtered buffer waits for a response from the next sequential buffer. Accordingly, the listener or listening code functions as a tool to support parallel and asynchronous processing of the buffers and associated segments when subject to analysis and frame identification.

The file processing and subject filtering shown and described in FIG. 2 is directed at processing file segments in parallel. More specifically, a parallel processor may be employed to process the file and associated buffers and buffer segments in parallel. Similarly, in one embodiment, different buffers of the file may be processed in parallel on different machines. The amount of time it takes to process the file in its entirety will be less than or equal to the length of the longest segment. The listener that is attached to each of the buffers accounts for asynchronous processing so that an associated receiver of the processed buffer(s) and buffer segments will know how to piece the distributed data back together.

Referring to FIG. 3, a block diagram (300) is provided to illustrate an example video file and associated processing. It is understood that the file is received with a file format. As shown in FIG. 2, the file is partitioned (310). In this example, the file is shown with three partitions, (312), (314), and (316), although this quantity should not be considered limiting. The portion of the file in each partition is referred to as a partition segment. A buffer, also referred to herein as a segment buffer, is shown for each of the partitions. More specifically, segment buffer (322) is provided for partition (312), segment buffer (324) is provided for partition (314), and segment buffer (326) is provided for partition (316). Each partition segment assigned to each buffer is subject to further segmentation, also referred to herein as chunking. In the example shown herein, each segment buffer is shown with multiple partition segments and each partition segment is separated into multiple partition chunks. More specifically, segment buffer (322) is shown with partition segments (322a), partition segments (322b), and partition segments (322c), segment buffer (324) is shown with partition segments (324a), partition segments (324b), and partition segments (324c), and segment buffer (326) is shown with partition segments (326a), partition segments (326b), and partition segments (326c). The quantity of segment buffers and partition segments is merely illustrative and should not be considered limiting.

Each of the buffers and their respective segments are subject to or submitted to an encoder (330). In one embodiment, the segment file is a video file and the encoder (330) is a video encoder. The encoded format may be pre-defined such that each second formatted segment will have a specific format, such as, but not limited to, .avi, .mov., .flv., .mpeg, .mpg, .gif, .mp3, .mp4, .wav, .wma, etc. The encoding of the first formatted segments is performed in each associated segment buffers in parallel while keeping the order of the original segments intact.

In addition to the file format uniformity, the start time and time span for each first formatted segment is identified and attached to each segment as metadata to the respective segment. As shown herein, segment buffer (340) is shown with segment buffers (342), (344), and (346). Segment buffer (342) is shown with segments (342a) and attached or embedded metadata (342b) and (342c). Similarly, segment buffer (344) is shown with segments (342a) and attached or embedded metadata (344b) and (344c), and segment buffer (346) is shown with segments (346a) and attached or embedded metadata (346b) and (346c). Accordingly, as shown, each segment (342), (344), and (346) has a uniform file format and attached metadata.

Each of the formatted segment buffers (342), (344), and (346) is routed to a video processing service on a buffer basis. In one embodiment, the video processing service is an Application Programming Interface (API). Similarly, in one embodiment, a separate API object may be assigned to each of the second formatted segments. In one embodiment, the API object(s) are video processing services to analyze content of the formatted segments that include code to identify one or more objects that are the subject of the formatted segments present in each pipe. The code is specific and uniquely coded to identify specific features of interest, e.g. objects, facial features, vehicle, vehicle type, subjects, sounds, words, word combinations, etc., in video segments. As shown, $API_0$ (352a), $API_1$ (352b) and $API_2$ (352c) are respectively assigned to the segments of the segment buffer (342). Similarly, $API_3$ (354a), $API_4$ (354b), and $API_5$ (354c) are respectively assigned to the segments of the segment buffer (344), and $API_6$ (356a), $API_7$ (356b), and $API_8$ (356c) are respectively assigned to the segments of segment buffer (346).

As shown and described in FIG. 2, the video processing incorporates an application listener or listening code, hereinafter referred to as a listener, to each segment to account for asynchronous processing of the segments. The listener is encoded into the segment to facilitate re-ordering segments that may have their processing completed out of order. As shown herein, the listener is attached on a buffer basis, although this attachment configuration should not be considered limiting. For example, in one embodiment, the listener may be attached on a segment basis. As shown, the buffers and associated segment alignment is maintained, with the segments being uniformly formatted and well-formed, e.g. with attached metadata. The buffers (362), (364) and (366), and shown herein with their respective segments, including (362a), (364a), and (366a). In addition, each buffer is shown with their attached listener (362b), (364b), and (366b), respectively. The listener functions to tell an associated processor when the buffer processing is completed. Accordingly, with the attachment of the listener, the well-formed segments are prepared and ready for analysis and filtering.

The buffers and their associated processed segments are subject to filtering and analysis. Each buffer is subject to analysis to determine elements of interest in the associated segments. As shown, buffer (372) has segments (372a) each subject to analysis, buffer (374) has segments (374a) each subject to analysis, and buffer (376) has segments (376a) each subject to analysis. The segments do not have any knowledge of what it represents. However, the ordering of the segments is encoded, and in one embodiment is attached to the output of the analysis. Each buffer and buffer segment is subject to filtering, shown herein as being conducted separately and in parallel. As shown, buffer (372) is subject to filtering at (382), buffer (374) is subject to filtering at (384), and buffer (376) is subject to filtering at (386), with the filtering of buffers (372), (374), and (376) taking place parallel or concurrently. Referring to FIG. 2, the filtering effectively identifies frames of interest within each buffer. In the example shown herein, the frames of interest are referred to as results, which may include a single frame, multiple frames, or no frames, with the ordering of the identified frames maintained by the ordering of the buffers and buffer segments. As shown herein, buffer (372) has results (392), buffer (374) has results (394), and buffer (376) has results (396). Unnecessary results in each segment and associated buffer are filtered, thereby returning only frames of interest within each buffer or buffer segment. Any required location information, such as time stamp and frame number, are already encoded into the buffers via the metadata and buffer alignment, and is returned with the filtered frames. Accordingly, the returned frames are sequentially ordered on a buffer basis with use of the respective listener, and sequentially ordered on a segment basis with use of the encoded metadata.

Figure 4:
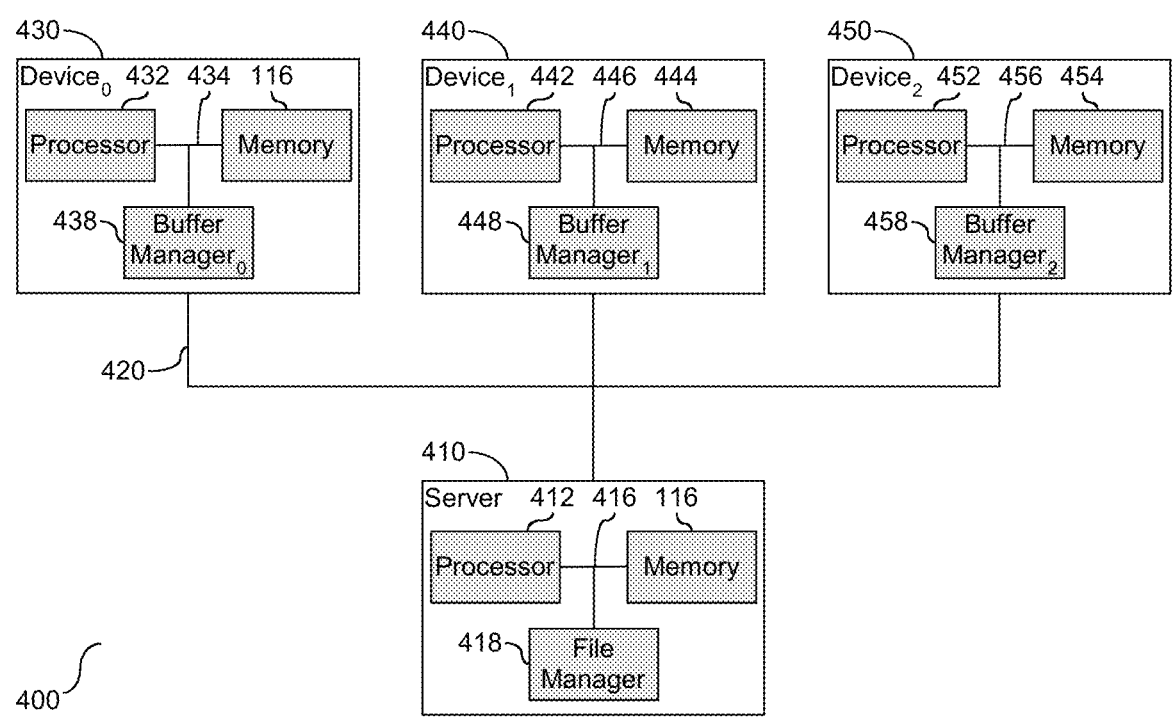
FIG. 4 depicts a block diagram illustrating parallel processing of the segmented buffer.

The file processing shown and described herein creates well formatted segments to support and enable parallel processing while maintaining the order of the file segments. Referring to FIG. 4, a block diagram (400) is provided to illustrate parallel processing of the segmented buffer. As shown, a server (410) is provided with a processing unit, e.g. processor, (412) operatively coupled to memory (416) across a bus (414). A file manager (418) is provided operatively coupled to the processing unit and memory. The file manager (418) functions as oversight for the file processing.

As further shown, multiple computing devices are operatively coupled to the server (410) across a network connection (420). In this example, there are three computing devices, including device$_0$ (430), device (440), and device$_2$ (450). Each device is configured with a processing unit and memory, and a segment manager to process the buffers transmitted to the respective device. Device$_0$ (430) is shown with processing unit (432) operatively coupled to memory (434) across bus (436), and buffer manager$_0$ (438). Similarly, device$_1$ (440) is shown with processing unit (442) operatively coupled to memory (444) across bus (446), and buffer manager$_1$ (448), and device$_2$ (450) is shown with processing unit (452) operatively coupled to memory (454) across bus (456), and buffer manager$_2$ (458). Each of the devices (430), (440), and (450) processes respective buffers in parallel, with identification of frames of interest communicated to the file manager (418). Accordingly, the file is encoded to support parallel and distributed processing of the buffer and associated file segments.

Aspects of object mining and object identification shown in FIGS. 1-4, employ one or more functional tools, as shown and described in FIG. 1. Aspects of the functional tools, e.g. receiver, encoder, and manager, and their associated functionality may be embodied in a computer system/server in a single location, or in one embodiment, may be configured in a cloud based system sharing computing resources. With references to FIG. 5, a block diagram (500) is provided illustrating an example of a computer system/server (502), hereinafter referred to as a host (502) in communication with a cloud based support system, to implement the processes described above with respect to FIGS. 1-4. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments where tasks are performed by remote processing devices that are linked through a communications network. In a distributed cloud computing environment, program modules may be located in both local and remote computer system storage media including memory storage devices.

Figure 5:
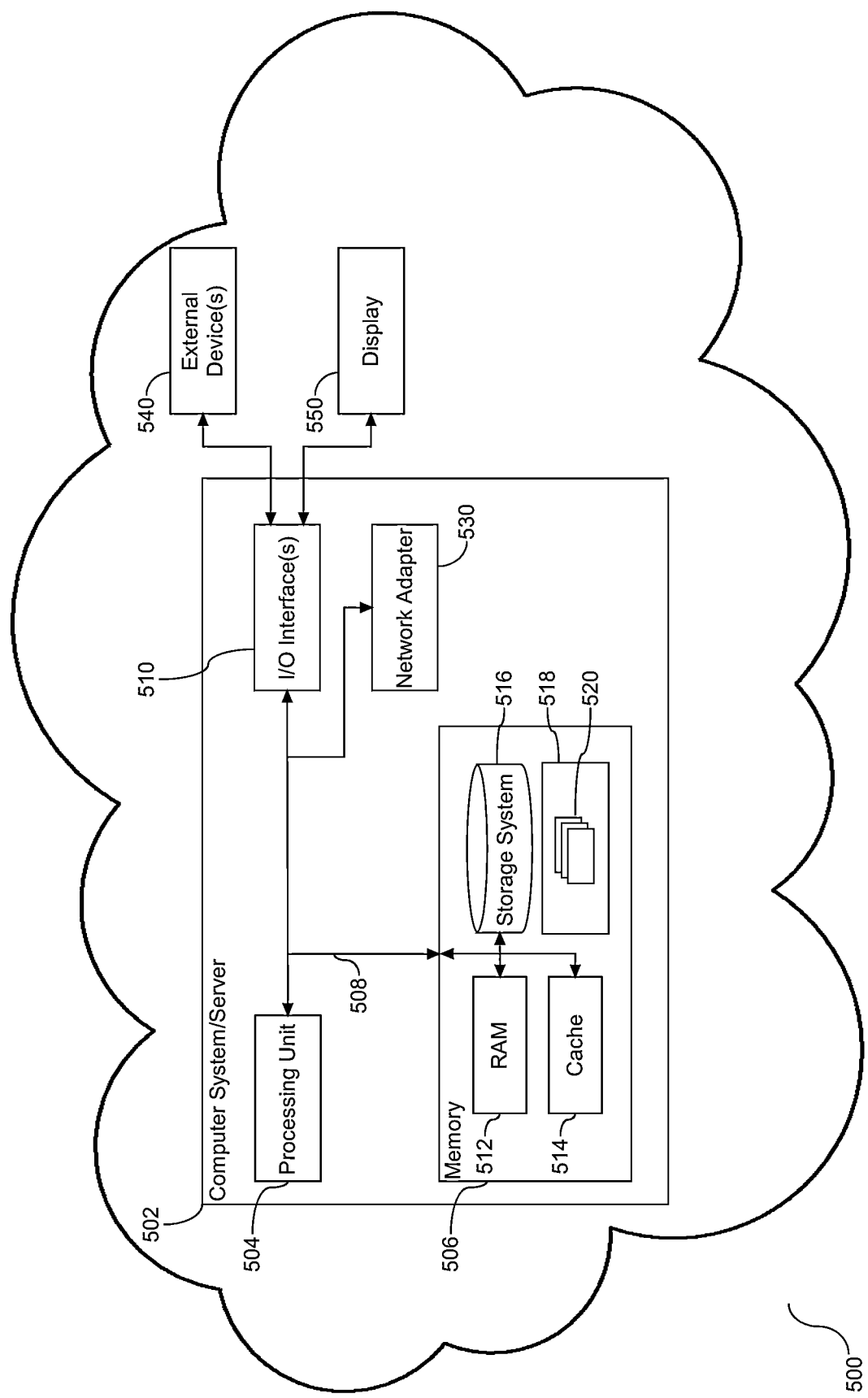
FIG. 5 depicts a block diagram illustrating an example of a computer system/server of a cloud based support system, to implement the system and process described above with respect to FIGS. 1-4.

As shown in FIG. 5, host (502) is shown in the form of a general-purpose computing device. The components of host (502) may include, but are not limited to, one or more processors or processing units (504), e.g. hardware processors, a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (512) and/or cache memory (514). By way of example only, storage system (516) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (518), having a set (at least one) of program modules (520), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (520) generally carry out the functions and/or methodologies of embodiments to dynamically process files for image and object identification, while supporting parallel and asynchronous processing of file buffers. For example, the set of program modules (520) may include the receiver, encoder, manager as described in FIGS. 1-4.

Host (502) may also communicate with one or more external devices (540), such as a keyboard, a pointing device, etc.; a display (550); one or more devices that enable a user to interact with host (502); and/or any devices (e.g., network card, modem, etc.) that enable host (502) to communicate with one or more other computing devices. Such communication can occur via Input/Output (I/O) interface(s) (510). Still yet, host (502) can communicate with one or more networks such as a local area network (LAN), a general wide area network (WAN), and/or a public network (e.g., the Internet) via network adapter (530). As depicted, network adapter (530) communicates with the other components of host (502) via bus (508). In one embodiment, a plurality of nodes of a distributed file system (not shown) is in communication with the host (502) via the I/O interface (510) or via the network adapter (530). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (512), cache (514), and storage system (516), such as a removable storage drive and a hard disk installed in a hard disk drive.

Computer programs (also called computer control logic) are stored in memory (506). Computer programs may also be received via a communication interface, such as network adapter (530). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
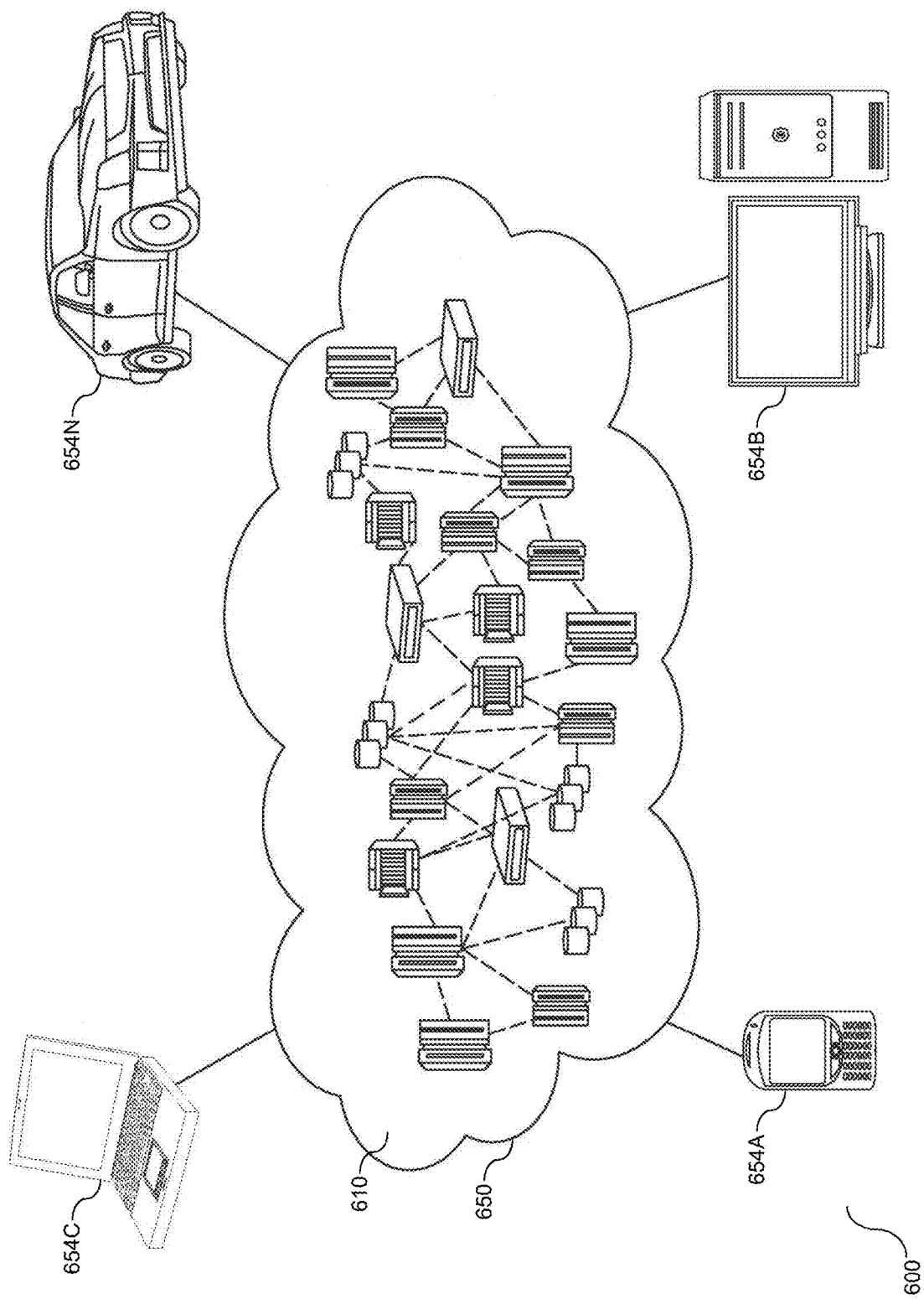
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 6 are intended to be illustrative only and that the cloud computing environment (650) can communicate with any type of computerized device over any type of network and/or network addressable connection (e.g., using a web browser).

Figure 7:
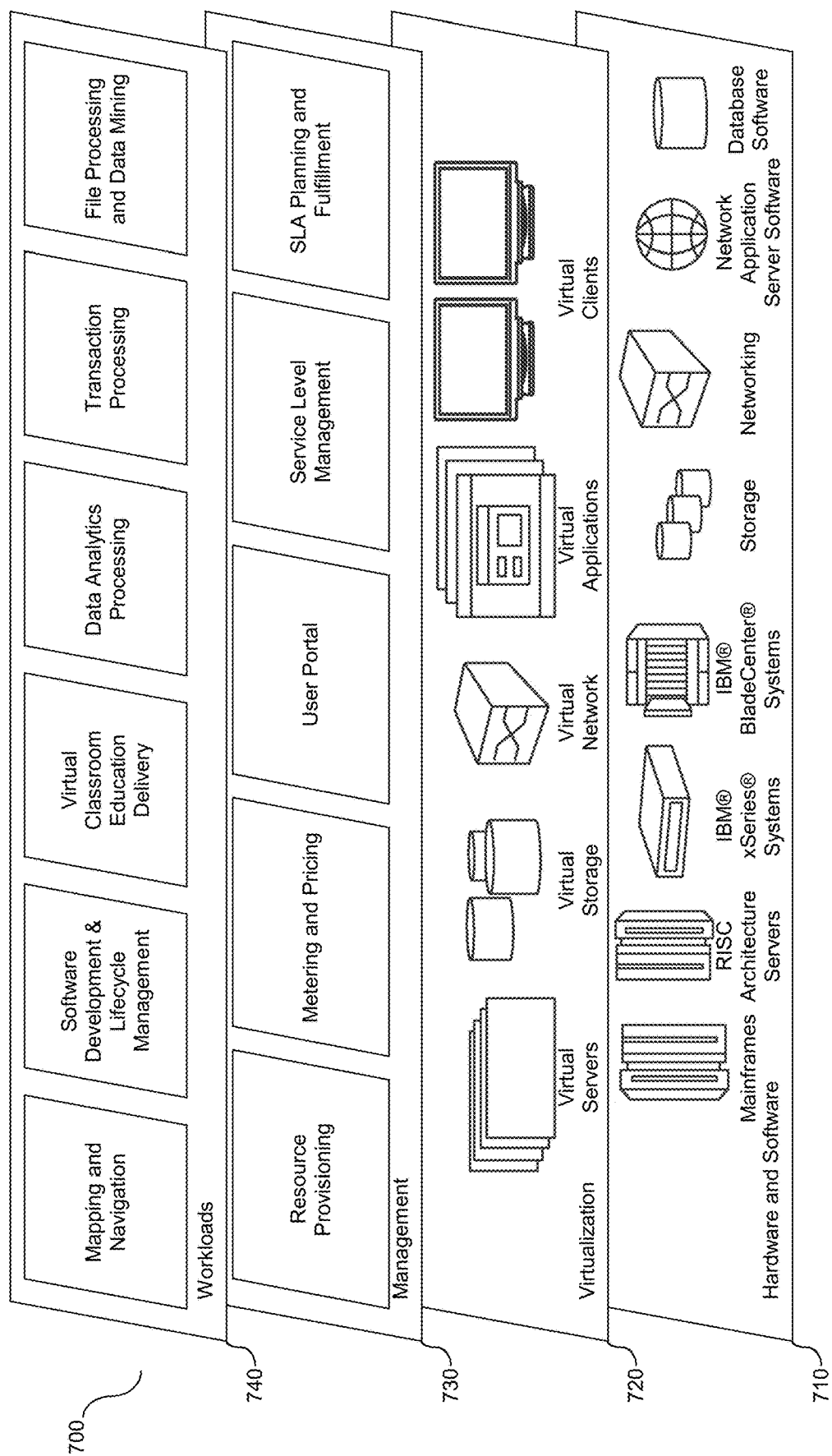
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and file processing and image mining.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation of facet and facet value identification and management provides document efficient translations and analysis of idioms.

It will be appreciated that, although specific embodiments have been described herein for purposes of illustration, various modifications may be made without departing from the spirit and scope of the embodiments. In particular, the tools of the system shown and described may be utilized in conjunction with machine learning technology and applied to a corpus external to the knowledge base to return sequential ordering of identified objects, images, and/or frames. Accordingly, the scope of protection is limited only by the following claims and their equivalents.

What is claimed is:

1. A system comprising:
   a processing unit operatively coupled to memory;
   a receiver, operatively coupled to the processing unit, the receiver configured to receive at least one file having data in a first format;
   an encoder, operatively coupled to the receiver, the encoder configured to:
      separate the received file into a plurality of segments having a sequential order;
      convert the segments to a second format having a uniform format with respect to one another;
      assign the segments to associated buffers; and
      associate markers with the buffers, the associated markers configured to account for asynchronous processing of the buffers and permit re-ordering of the buffers on a buffer basis into the sequential order;
   a manager, operatively coupled to the encoder, the manager configured to:
      concurrently send the buffers having the assigned segments in the uniform format to two or more image analysis services for asynchronous image recognition processing;
      selectively identify one or more frames interest in one or more of the buffers, wherein each of the identified one or more frames includes a recognized image meeting an analysis criterion based on the image recognition processing;
      selectively remove one or more frames determined to be irrelevant based on the analysis criterion from the one or more buffers while leaving the selectively identified one or more frames in the one or more buffers; and
      create a file output comprising an arrangement of the selectively identified one or more frames.

2. The system of claim 1, wherein the encoder is configured to attach the markers to the buffers.

3. The system of claim 2, wherein the manager is configured to combine the selectively identified one or more frames in the sequential order.

4. The system of claim 1, wherein the asynchronous image recognition processing comprises parallel image recognition processing.

5. The system of claim 1, wherein the encoder is configured to select a conversion format complying with one or more specifications of the selected conversion format to encode each first formatted segment into the second formatted segment.

6. A computer program product for file analysis, the computer program product comprising:
   a computer readable storage device having program code embodied therewith, the program code executable by a processor to:
      receive at least one file having data in a first format;
      encode the received file, including separate the received file into a plurality of segments having a sequential order, convert the segments to a second format having a uniform format with respect to one another, assign the segments in associated buffers, and associate markers with the buffers, the associated markers configured to account for asynchronous processing of the buffers to permit re-ordering of the buffers on a buffer basis into the sequential order;
      concurrently send the buffers having the assigned segments in the uniform format to two or more image analysis services for asynchronous image recognition processing;
      selectively identify one or more frames in one or more of the buffers, wherein each of the identified one or more frames includes a recognized image meeting an analysis criterion based on the image recognition processing;
selectively remove one or more frames determined to be irrelevant based on the analysis criterion from the one or more buffers while leaving the selectively identified one or more frames in the one or more buffers; and
create a file output comprising an arrangement of the selectively identified one or more frames.

7. The computer program product of claim 6, wherein the program code to encode the segments into the buffer includes program code executable by the processor to attach the markers to the buffers.

8. The computer program product of claim 7, further comprising program code is executable by the processor to combine the selectively identified one or more frames in the sequential order.

9. The computer program product of claim 6, wherein the asynchronous image recognition processing comprises parallel image recognition processing.

10. The computer program product of claim 6, further comprising program code executable by the processor to select a conversion format complying with one or more specifications of the selected conversion format to encode each of the segments to have the second format.

11. A method comprising:
receiving at least one file having data in a first format;
encoding the received file, including separating the received file into a plurality of segments having a sequential order, converting the segments to a second format having a uniform format with respect to one another, assigning the segments to associated buffers, and associating markers with the buffers, the associated markers configured to account for asynchronous processing of the buffers to permit re-ordering of the buffers on a buffer basis into the sequential order;
concurrently sending parallel the buffers having the assigned segments in the uniform format to two or more image analysis services for asynchronous image recognition processing;
selectively identifying one or more frames in one or more of the buffers, wherein each of the identified one or more frames includes a recognized image meeting an analysis criterion based on the image recognition processing; and
selectively removing one or more frames determined to be irrelevant based on the analysis criterion from the one or more buffers while leaving the selectively identified one or more frames in the one or more buffers;
creating a file output comprising an arrangement of the selectively identified one or more frames.

12. The method of claim 11, wherein encoding the plurality of segments comprises attaching the markers to the buffers.

13. The method of claim 12, further comprising combining the selectively identified one or more frames in the sequential order.

14. The method of claim 11, wherein the asynchronous image recognition processing comprises parallel image recognition processing.

15. The method of claim 11, further comprising selecting a conversion format and complying with one or more specifications of the selected conversion format to encode each of the segments to have the second format.

16. The system of claim 1, wherein the manager is configured to send the two or more buffers to two or more computing devices for the parallel image recognition processing.

17. The system of claim 1, wherein the manager is configured to remove an irrelevant frame not meeting the analysis criterion from at least one of the two or more buffers.

18. The system of claim 1, wherein the encoder is configured to attach metadata to the segments, the attached metadata directed at a time sequence of the segments to permit re-ordering of the segments on a segment basis into the sequential order.

19. The computer program product of claim 6, further comprising program code executable by the processor to attach metadata to the segments, the attached metadata directed at a time sequence of the segments to permit re-ordering of the segments on a segment basis into the sequential order.

20. The method of claim 11, further comprising attaching metadata to the segments, the attached metadata directed at a time sequence of the segments to permit re-ordering of the segments on a segment basis into the sequential order.

* * * * *